(12) United States Patent
Kopelas et al.

(10) Patent No.: US 12,319,083 B2
(45) Date of Patent: Jun. 3, 2025

(54) WRITING INSTRUMENTS

(71) Applicant: BIC Violex Single Member S.A., Anoixi (GR)

(72) Inventors: Panagiotis Kopelas, Anoixi (GR); Georgios Katsikas, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 18/394,771

(22) Filed: Dec. 22, 2023

(65) Prior Publication Data

US 2024/0208261 A1 Jun. 27, 2024

(30) Foreign Application Priority Data

Dec. 22, 2022 (EP) ..................... 22216162

(51) Int. Cl.
*B43K 24/08* (2006.01)
*B43K 8/02* (2006.01)

(52) U.S. Cl.
CPC ............ *B43K 24/082* (2013.01); *B43K 8/028* (2013.01)

(58) Field of Classification Search
CPC .......... B43K 24/08; B43K 8/028; B43K 8/24; B43K 23/08; B43K 24/082
USPC .................................................. 401/107, 108
See application file for complete search history.

(56) References Cited

U.S. PATENT DOCUMENTS

| | | |
|---|---|---|
| 3,525,573 A | 8/1970 | Fend |
| 3,836,264 A | 9/1974 | Motoyama et al. |
| 4,911,569 A | 3/1990 | Hashimoto et al. |
| 4,969,764 A * | 11/1990 | Gregory ................. B43K 8/028 401/107 |
| 5,022,773 A * | 6/1991 | Waldinger ............... B43K 7/12 401/59 |
| 5,967,684 A | 10/1999 | Huang et al. |
| 6,817,800 B2 | 11/2004 | Sung |
| 7,226,229 B1 | 6/2007 | Register |

(Continued)

FOREIGN PATENT DOCUMENTS

| | | |
|---|---|---|
| CN | 2811011 Y | 8/2006 |
| CN | 201021000 Y | 2/2008 |

(Continued)

OTHER PUBLICATIONS

Search Report issued in European Patent Application No. 22216162.2, mailed on May 19, 2023.

*Primary Examiner* — David J Walczak
(74) *Attorney, Agent, or Firm* — Bookoff McAndrews, PLLC (57) ABSTRACT

A writing instrument may include a barrel having a longitudinal axis, a cartridge, a writing tip, a self-retracting and sealing system for sliding the cartridge inside the barrel between a first position wherein the writing tip extends outside the barrel and a second position wherein the writing tip is retracted, the system comprising a button configured to move the cartridge between the first and the second position, and a sealing member configured to be actuated between a closed position closing a writing passage of the writing instrument, wherein the cartridge is configured to actuate the sealing member to the open position when the cartridge is moved to the first position and to allow the sealing member in the closed position when the cartridge is in the second position.

20 Claims, 11 Drawing Sheets

(56) References Cited

U.S. PATENT DOCUMENTS

| | | | |
|---|---|---|---|
| 7,488,130 B2 * | 2/2009 | Dylkiewicz | B43L 19/0068 |
| | | | 401/107 |
| D692,948 S | 11/2013 | Boisdevesys et al. | |
| 10,406,849 B1 | 9/2019 | Al-Khulaifi | |
| 2007/0243007 A1 | 10/2007 | Chang et al. | |
| 2008/0267687 A1 | 10/2008 | Blair | |
| 2009/0232581 A1 | 9/2009 | Tong | |

FOREIGN PATENT DOCUMENTS

| | | | |
|---|---|---|---|
| CN | 201597309 U | 10/2010 | |
| CN | 201913937 U | 8/2011 | |
| CN | 203528131 U | 4/2014 | |
| CN | 204432079 U | 7/2015 | |
| CN | 106891640 A | 6/2017 | |
| CN | 210680172 U | 6/2020 | |
| CN | 211493430 U | 9/2020 | |
| CN | 212400726 U | 1/2021 | |
| CN | 307027751 S | 12/2021 | |
| CN | 307181260 S | 3/2022 | |
| DE | 452723 C | 11/1927 | |
| DE | 3214706 A1 | 12/1982 | |
| DE | 10116655 A1 | 10/2002 | |
| JP | S53154038 U | 12/1978 | |
| JP | 4649517 B2 | 3/2011 | |
| JP | 6033028 B2 | 11/2016 | |
| KR | 2020100001899 U | 2/2010 | |
| KR | 20110092443 A | 8/2011 | |
| KR | 101069452 B1 | 9/2011 | |
| KR | 200249664 Y1 | 11/2021 | |

* cited by examiner

WRITING INSTRUMENTS

CROSS REFERENCE TO RELATED APPLICATIONS

This application claims benefit from European patent application EP 22216162.2 filed on Dec. 22, 2022, its content being incorporated herein by reference.

Technical Field

The present disclosure relates to the field of writing devices. More specifically, the present disclosure relates to writing devices with a writing tip that can be extended and retracted and sealed.

Background

Writing instruments comprising a barrel and a writing tip that can be extended outside the barrel for writing purpose when a user actuates a writing tip extension-retraction system inside the barrel and retracted inside the barrel when the user no longer needs to use the writing instrument are largely known.

However, these systems are not designed to provide protection to the internal components of the writing instrument, which may be subject to damage or drying out if exposed to the ambient environment, while also prioritizing seamless extension of the writing tip during operation and retraction during non-operation.

The present disclosure aims to address one or more problems in the prior art.

SUMMARY

In a first aspect, the present disclosure relates to a writing instrument comprising a barrel having a longitudinal axis, a cartridge, a writing tip provided at one end of the cartridge, a self-retracting and sealing system configured to slide the cartridge axially inside the barrel between a first extended forward position wherein the writing tip extends outside the barrel and a second retracted rearward position wherein the writing tip is retracted inside the barrel from the first extended forward position along an axial rearward direction, the self-retracting and sealing system comprising: a button configured to, when actuated, move the cartridge into the first extended forward position, and when not actuated, move the cartridge into the second retracted rearward position, and a sealing member configured to be actuated between a closed position where the sealing member substantially closes a writing passage of the writing instrument and an open position where the writing passage is not closed by the sealing member, wherein the cartridge is configured to actuate the sealing member from the closed position to the open position when the cartridge is moved from the second retracted rearward position to the first extended forward position and to allow the sealing member to move from the open position to the closed position when the cartridge is in the second retracted rearward position.

Thus, aspects of the present disclosure are able to provide an intuitive system for providing the easiest usage experience along with superior protection of the sensitive inner components of the writing instrument. Opening the writing instrument is natural and unobtrusive to the use of the writing instrument itself. Further, when the writing instrument is not in use, the writing tip may be automatically withdrawn into the barrel of the writing instrument and protected against the deleterious effects of the ambient environment. Additionally, the system is not bound to the orientation of the writing instrument itself, and thus is effective regardless of the circumstances of usage.

In an example, the sealing member comprises two moveable sealing parts configured to move between the closed position and the open position of the sealing member.

In an example, the sealing member comprises more than two moveable sealing parts, for example three or four sealing parts.

In an example, the sealing parts are configured to pivot around respective transverse axes, between the closed position and the open position.

In an example, the sealing parts sealingly cooperate with each other when the sealing member is in the closed position. By 'sealingly cooperate with each other' is understood that the contact between the sealing parts is substantially airtight so that air at atmospheric pressure does not tend to permeate at the contact surface, thus avoiding or substantially avoiding air exchanges between the inside of the sealing member where the writing passage is located, and the outside of the sealing member.

In case of more than two moveable sealing parts, a sealing part may be in contact with some or every other sealing parts.

In an example, the sealing parts are configured to be brought together in the closed position of the sealing member and to move apart from each other in the open position.

In an example, in the open position, the sealing parts define between them a passage for the writing tip. The passage may include the writing passage.

In an example, the writing member comprises a first biasing member for urging the sealing member from the open position to the closed position.

In an example, the first biasing member comprises a resilient member attached to the sealing parts so as to permanently urge the sealing parts to be brought together.

By 'permanently urge' is understood continuously applying an effort to bring parts together, in particular the sealing parts. The effort may be an effort to bring the sealing parts together when in the open position and to maintain the sealing parts together when in the closed position.

The resilient member of the first biasing member may be an elastic member. For example, the resilient member of the first biasing member may be a toric elastic member.

In an example, the cartridge is configured to push against an inner surface of the sealing member to actuate the sealing member from the closed position to the open position.

In an example, the button is configured to actuate the sealing member from the open position to the closed position, more specifically by pushing against an outer surface of the sealing member, in particular of a wall of the sealing member. By "outer surface" is for example understood a surface facing away from the writing tip.

In an example, the self-retracting and sealing system further comprises a linkage that connects the button and the cartridge, the linkage being configured to convert an actuation of the button into a linear motion of the cartridge along the longitudinal axis.

In an example, the sealing member is configured to interact with the cartridge when the sealing member is in the closed position so as to form a substantially airtight sealing chamber therein, the writing tip being inside the sealing chamber when the cartridge is in the second retracted rearward position.

In an example, the sealing member further comprises an axial wall attached on the cartridge and forming a wall of the sealing chamber.

In an example, the button is located at or near a forward end of the barrel so as to be operated by a user when the writing instrument is held in a writing position.

In an example, the self-retracting and sealing system further comprises a second biasing member configured to urge the self-retracting and sealing system toward the second retracted rearward position.

In an example, the second biasing member is a spring.

In an example, the second biasing member is configured to exert permanent opposite pressure against the actuation of the button.

In an example, the second biasing member is connected to the cartridge.

In an example, the linkage is configured to better resist the second biasing member the more parallel the linkage is to the longitudinal axis during actuation.

Thus, due to the construction of the writing instrument, the sealing system is able to avoid adding undue strain to the user while still operating effectively. The user does not need to provide excess force to keep the button pressed, and so any additional inconvenience by the inclusion of the system is avoided.

In an example, the writing instrument comprises a cap mounted at a forward end of the writing instrument, the cap having a writing passage facing the writing tip, wherein the cap is configured to be actuated rearward when the button is actuated.

In an example, the writing instrument further comprises a cartridge carrier having one or more bearings for supporting the cartridge inside the barrel.

In an example, the writing tip is a stylus for use with an electronic writing surface.

In an example, the cartridge is configured to supply writing medium such as ink to the writing tip.

The writing medium may comprise or consist of a solid writing medium, for example graphite; a liquid writing medium, for example ink; or any kind of writing medium available to the skilled person.

In an example, the writing instrument is ink-based. In other words, the writing medium is made of or comprises ink.

DETAILED DESCRIPTION

Hereinafter, a detailed description will be given of the present disclosure. The terms or words used in the description and the aspects of the present disclosure are not to be construed limiting as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

On the drawings, identical elements (or parts of elements) are identified with the same reference signs. Between different embodiments, reference signs of elements (or parts of elements) having an analogous function share reference signs are incremented by 100, 200, etc.

Hereunder, the numbering "first" and "second" are to be understood as identifying and differentiating elements. The numbering is not meant to be understood as a ranking of relative importance of the elements. Unless stated otherwise, a "first" or a "second" element may be defined without the other "second" or "first" element.

In the present disclosure the term "gravity" naturally refers to the Newtonian gravitational acceleration created by the earth and the term "gravity direction" refers to the direction of the acceleration which is oriented downwardly with respect to the location where the writing instrument is located.

In a first exemplary embodiment, the present disclosure relates to a writing instrument 10 as shown in FIGS. 1 to 8 of which the description follows. Certain features of the writing instrument 10 are rendered invisible for ease of view in the figures. The following description will be made with reference to FIGS. 1 to 8 simultaneously as some details of the writing instrument do not appear on all the figures.

The writing instrument 10 may be a marker, a felt pen, a highlighter, a ball point pen, a permanent or non-permanent marker or any other type of writing instrument or stylus with an extension and retraction mechanism for extending and retracting a writing tip of the instrument when necessary. The writing tip may, for example, convey ink to a writing surface when the writing instrument is ink-based. Alternatively, or additionally, the writing tip may be a contact point when the writing instrument is a stylus, such as, for instance, a stylus that may be used to interact with an electronic writing surface.

The writing instrument 10 may comprise a barrel or tubular body 12 having a longitudinal axis X. The tubular body 12 may be a unitary body, or may comprise multiple components.

The writing instrument 10 may comprise at a first forward end of the barrel 12 a cap 14 having a writing passage 14a formed therein. The cap 14 is mounted at the forward end of the writing instrument 10 such that the cap surrounds said forward end, with the writing passage 14a of the cap facing the writing tip 22, so as to allow the writing tip 22 to extend through the writing passage 14a when the cartridge is in the first extended forward position detailed below with respect to FIGS. 4, 5 and 6. The cap 14 may be detachably attached to the barrel 12, such that the tip component 14 may be removed, for example, to replace internal components of the writing instrument 10. The cap 14 and the barrel 12 may be of unibody construction (integrally formed). The writing instrument 10 may also include a cartridge 16. In an example where the writing instrument 10 is an ink-based marking device, the cartridge 16 may be a conveyance for transporting ink to a writing tip 22 of the cartridge 16, such as via a channel 16a. The writing instrument 10 may include components for supporting the cartridge 16 within the writing instrument 10, such as a cartridge carrier 13. The cartridge carrier 13 may include one or more bearings for centering the cartridge 16 inside the barrel 12. For example, the cartridge carrier 13 may include one or more sliding bearings. The writing instrument 10 may further comprise in the tubular body a tank (not shown) for storing a writing ink used by the writing tip 22. The barrel 12 may extend longitudinally in a rearward direction so as to cover as a sheath the internal components of the writing instrument 10. The writing instrument 10 may include other components or accessories typical to writing instruments, such as, but not limited to, a clip or an eraser.

The writing instrument 10 may comprise a self-retracting and sealing system 20 (hereinafter, "sealing system") that is configured to, when operated by a user, slide the writing tip 22 axially (along longitudinal axis X) through the barrel 12 between a first extended forward position (FIGS. 4, 5 and 6), wherein the writing tip 22 extends outside the writing passage 14a, and a second retracted rearward position (FIGS. 1, 2 and 3), in which the writing tip 22 has been retracted inside the barrel 12 along an axial rearward direction (arrow R) from the first extended forward position of FIGS. 4, 5 and 6. Black arrows are used in FIG. 6 to show local movements associated with actuation of the button 25. The sealing system 20 is further configured to enclose the writing tip 22 when in the second rearward position.

The sealing system 20 may include a button 25 with at least a portion that is located on an external face of the writing instrument 10 such that it is accessible to a user. The button 25 may be located such that the user may actuate the button 25 when holding the writing instrument 10 in a writing position, e.g., when the user is holding the writing instrument 10 near the first forward end of the writing instrument 10 so as to mark a surface using the writing instrument 10. In the example shown, the button 25 is a hinge-style projection that extends from the outer surface of the barrel 12 perpendicularly to axis X and is located proximately to the writing passage 14a. Thus, when a user is holding the writing instrument 10, such as to use the writing instrument 10 in the act of marking a surface, the user may be able to operate the button 25 in a manner that is natural to the act of gripping a writing instrument 10, such as to operate the button 25 with a finger of the writing hand.

The button 25 may be connected via a linkage 28 to the cartridge 16. The linkage 28 may be configured so as to convert an actuation of the button 25, which may produce a rotation of the linkage 28, into a linear motion of the cartridge 16 along axis X. FIGS. 4, 5 and 6 show views of the writing instrument 10 in a state during actuation of the button 25. When the button 25 is actuated, the portion of the linkage 28 connected to the button 25 may be moved towards axis X. This may push the portion of the linkage 28 connected to the cartridge 16 toward the writing passage 14a, and thus extend the writing tip 22 outside of the barrel 12 through the writing passage 14a. For instance, the portion of the linkage 28 connected to the button 25 may be substantially fixed laterally such that it moves along the axis X in sync with the button 25, but may be able to rotate at the point of the connection to the button 25. The portion of the linkage 28 connected to the cartridge 16 may be substantially fixed relative to the cartridge 16 such that it moves along the axis X in sync with the cartridge 16, but may be able to rotate at the point of the connection to the cartridge 16.

Figure 8:
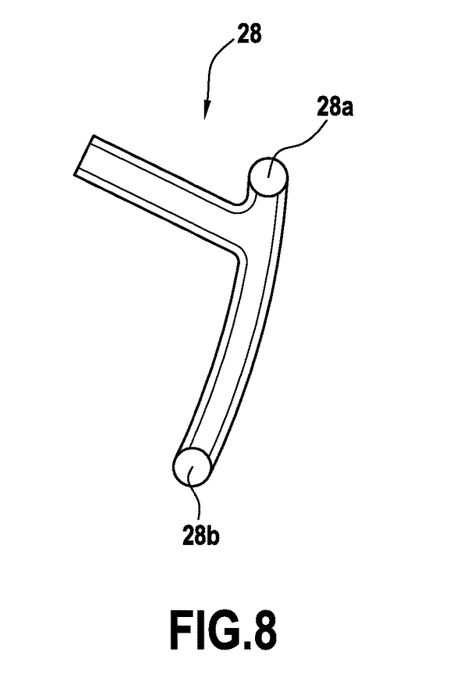
FIG. 8 shows a schematic side view of a linkage according to the first exemplary embodiment of the writing instrument.
Figure 9:
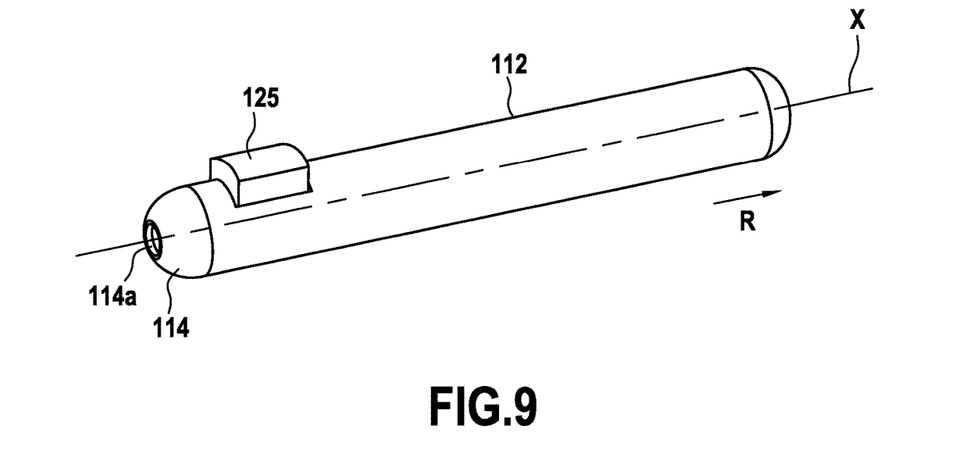
FIG. 9 shows a perspective view of a second exemplary embodiment of a writing instrument of the present disclosure in a retracted state.
Figure 10:
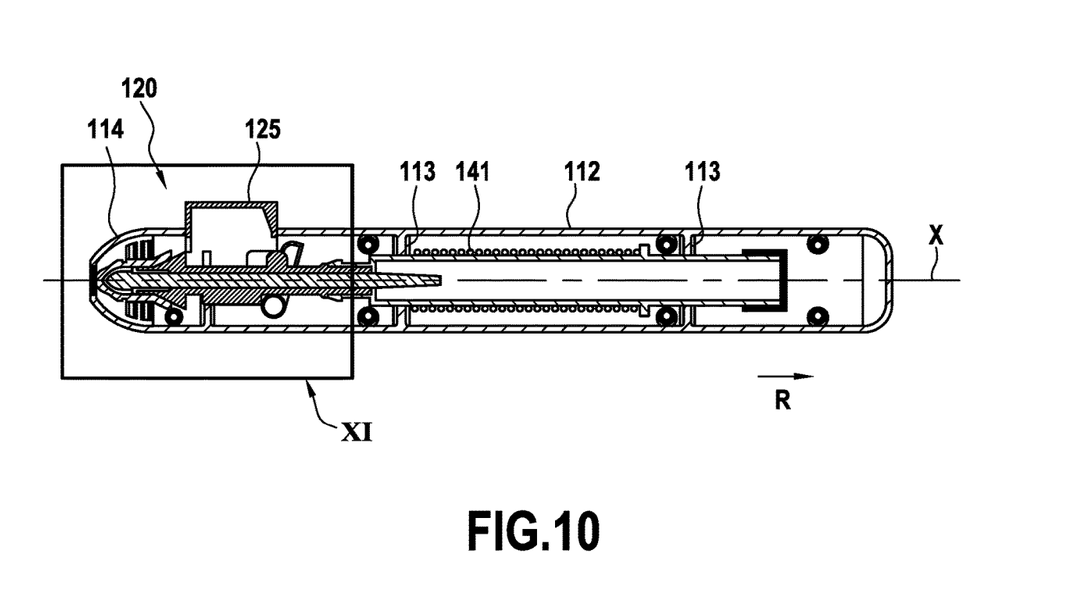
FIG. 10 shows a half-section view of the second exemplary embodiment of a writing instrument of the present disclosure in the retracted state.
Figure 11:
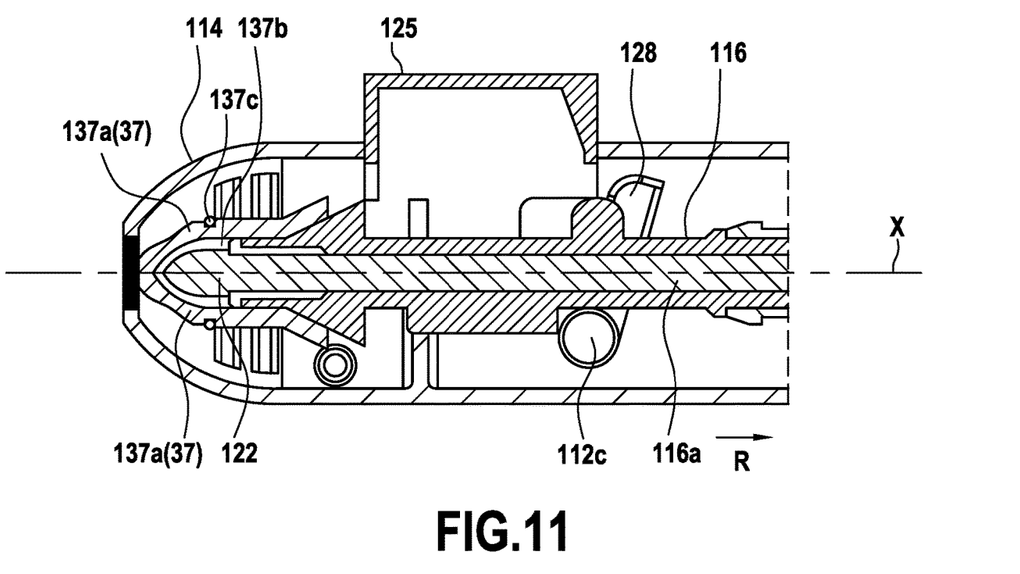
FIG. 11 shows a close-up view of the area XI of FIG. 10.
Figure 12:
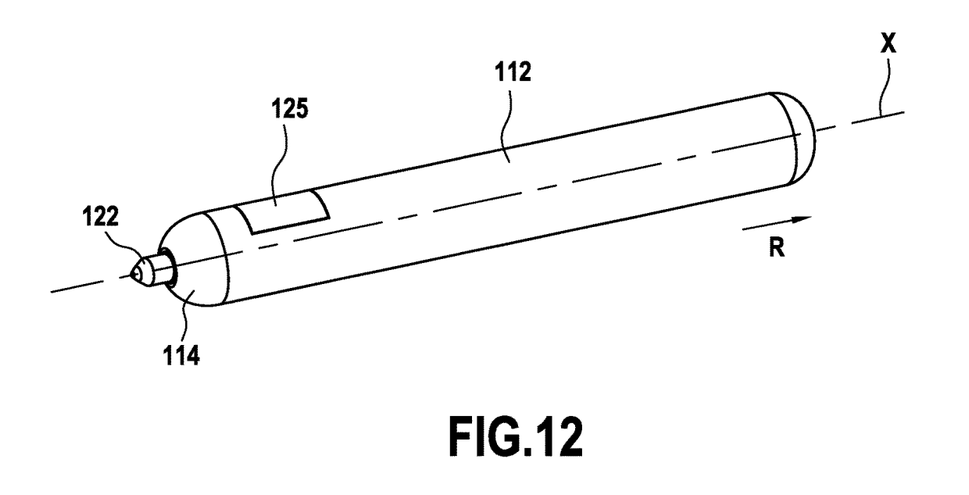
FIG. 12 shows a perspective view of the second exemplary embodiment of a writing instrument of the present disclosure in a writing state.
Figure 13:
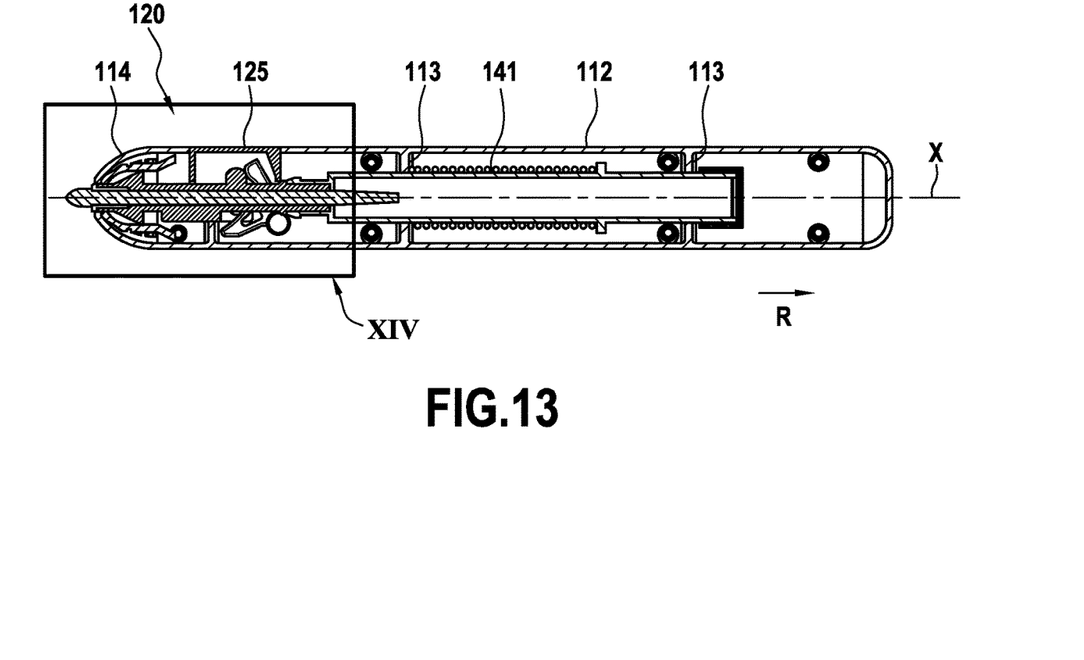
FIG. 13 shows a half-section view of the second exemplary embodiment of a writing instrument of the present disclosure in the writing state.
Figure 14:
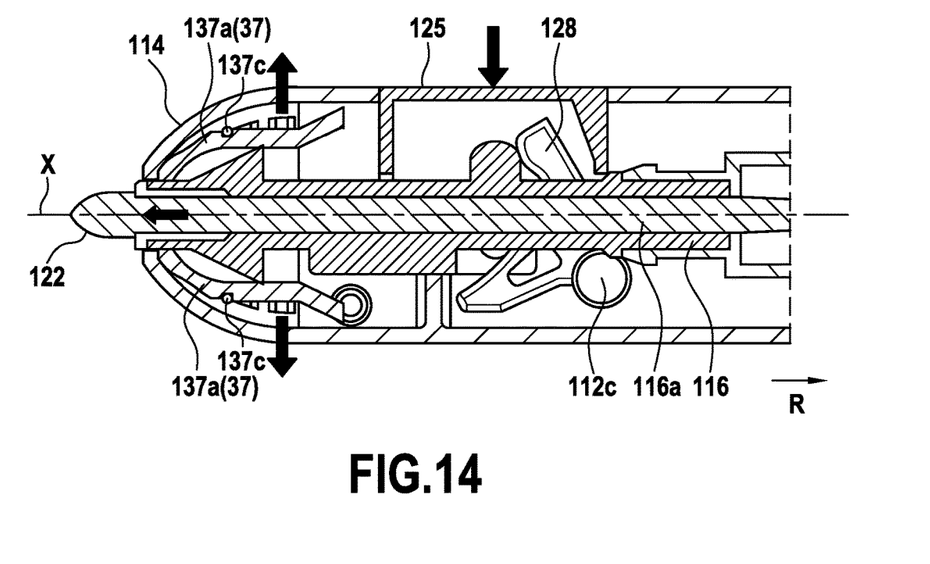
FIG. 14 shows a close-up view of the area XIV of FIG. 13.
Figure 15:
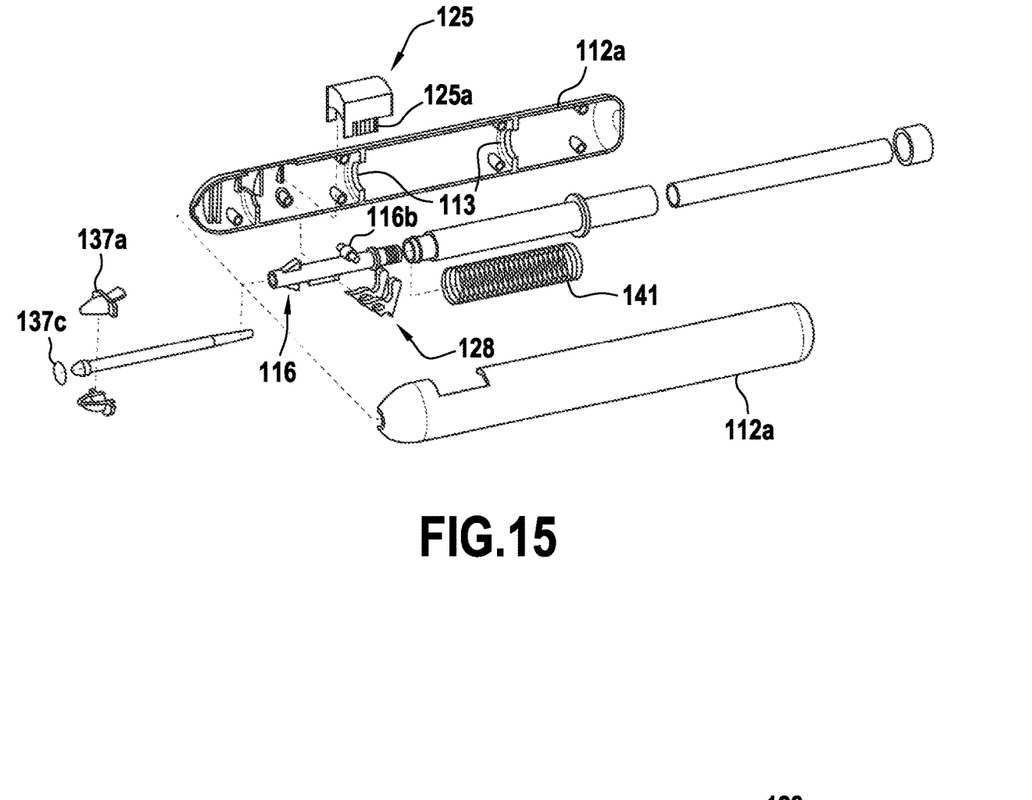
FIG. 15 shows an exploded view of the second exemplary embodiment of the writing instrument.

A schematic side view of the linkage 28 is shown on FIG. 8.

The linkage 28 may have a first end 28a configured to be connected to the button 25 in a rotating manner. For example, the first end 28a may have a lateral protrusion to be inserted in a hole 25a of the button 25 so as to form a pivot between the linkage 28 and the button 25. The button 25 may have two holes 25a on two sides of the button 25, and the first end 28a of the linkage 28 may have two protrusions, each protrusion inserted in a corresponding hole 25a so as to form a pivot between the button 25 and the linkage 28. The linkage 28 may be assembled with the button 25 in a snap-fit manner, so as to be locked with the button 25 once assembled.

The linkage 28 may have a second end 28b configured to be connected to the cartridge 16 in a rotating manner. For example, the second end 28b may have a protrusion to be inserted in a hole 16b of the cartridge 16 so as to form a pivot between the linkage 28 and cartridge 16.

Naturally, the pivots may also be obtained by inverting the male and female sides of the respective connections between the linkage 28 and the cartridge 16, and/or between the linkage 28 and the button 25.

The pivot between the cartridge 16 and the linkage 28 may be provided further frontward than the pivot between the button 25 and the linkage 28, in any position of the button 25 between the button 25 being actuated and not being actuated.

The cartridge 16 may be restrained so as to only be moveable in a sliding manner along the axis X. For instance, the barrel 12 may comprise at least one flange configured to restrain movement of the cartridge 16 away from the axis X.

Figure 1:
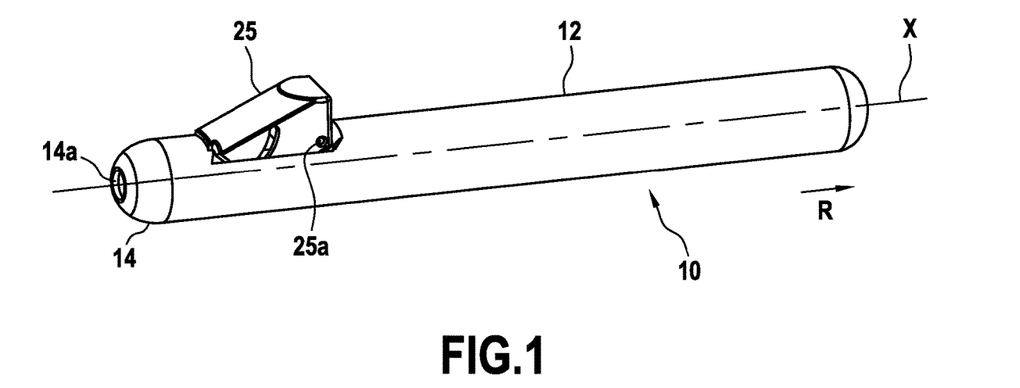
FIG. 1 shows a perspective view of a first exemplary embodiment of a writing instrument of the present disclosure in a retracted state.
Figure 2:
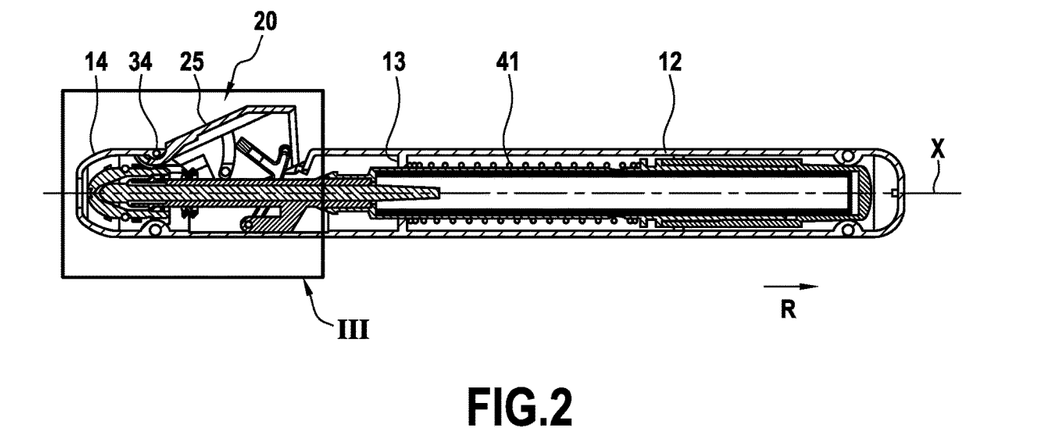
FIG. 2 shows a half-section view of the first exemplary embodiment of a writing instrument of the present disclosure in the retracted state.
Figure 3:
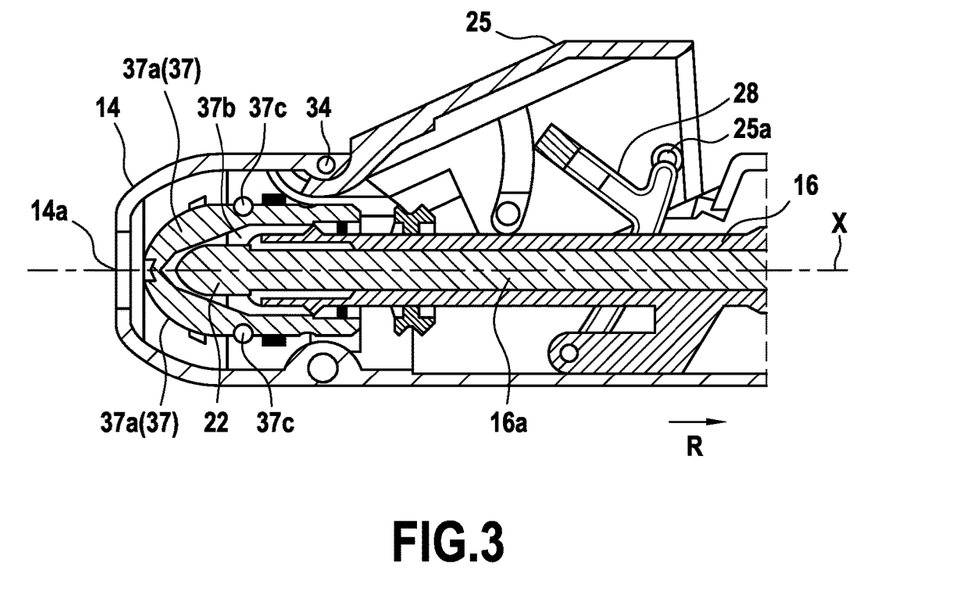
FIG. 3 shows a close-up view of the area III of FIG. 2.

As the button 25 is actuated, the first end 28a of the linkage 28 is pushed closer to the axis X, e.g. downward in the views of FIGS. 2 and 3. Due to the restrained axial movement of the cartridge 16 and the relative positioning of the pivots of the linkage 28, the second end 28b of the linkage 28 is then moved frontward, thereby bringing the cartridge 16 towards the first extended forward position.

The sealing system 20 may include a sealing member 37 that is configured to, when in a closed position (such as in FIGS. 1, 2 and 3), substantially close the writing passage 14a so as to enclose the writing tip 22 within the barrel 12 of the writing instrument 10, and when in an open position (such as in FIGS. 4, 5 and 6), allow passage of the writing tip 22 through the writing passage 14a outside of the barrel 12 of the writing instrument 10. The sealing member 37 may be located at or near the forward end of the barrel 12. In an aspect, the sealing member 37 comprises sealing parts 37a. Sealing parts 37a may be moveable sealing parts moving between the open position and the closed position. In the closed position, the sealing parts 37a substantially close the writing passage 14a by sealingly cooperating with each other. In the open position, the sealing parts 37a allow passage of the writing tip 22 through the writing passage 14a outside of the barrel 12 of the writing instrument 10.

Figure 4:
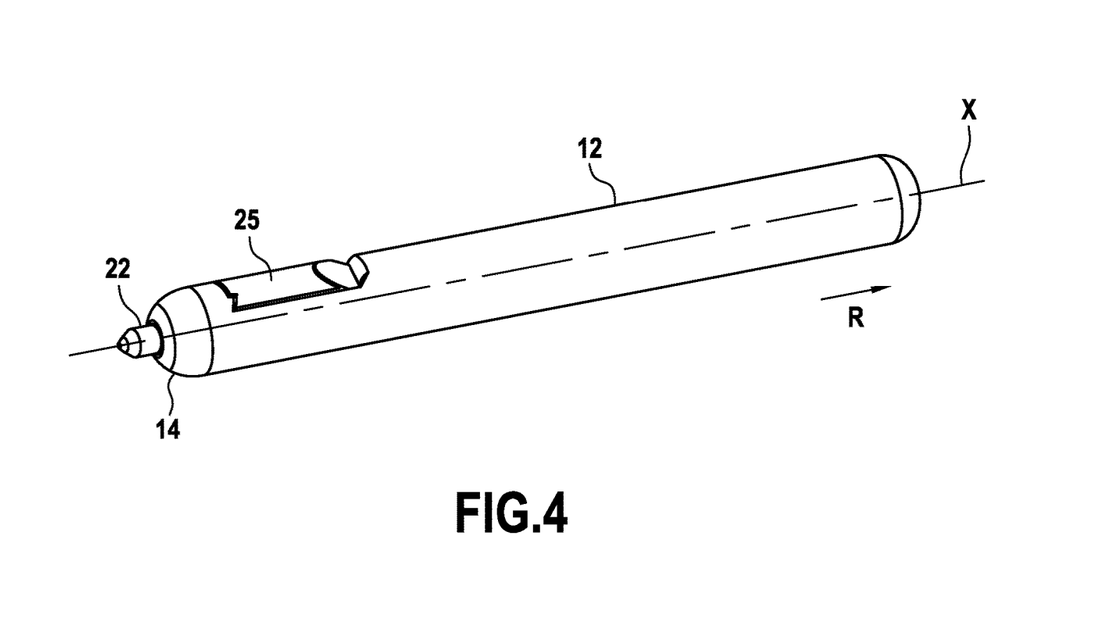
FIG. 4 shows a perspective view of the first exemplary embodiment of a writing instrument of the present disclosure in a writing state.
Figure 5:
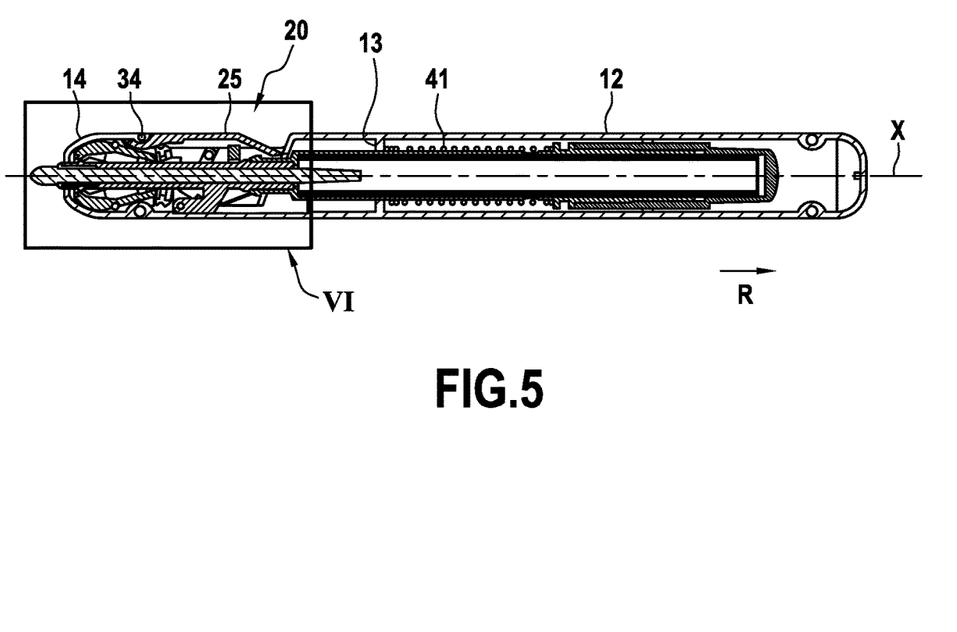
FIG. 5 shows a half-section view of the first exemplary embodiment of a writing instrument of the present disclosure in the writing state.
Figure 6:
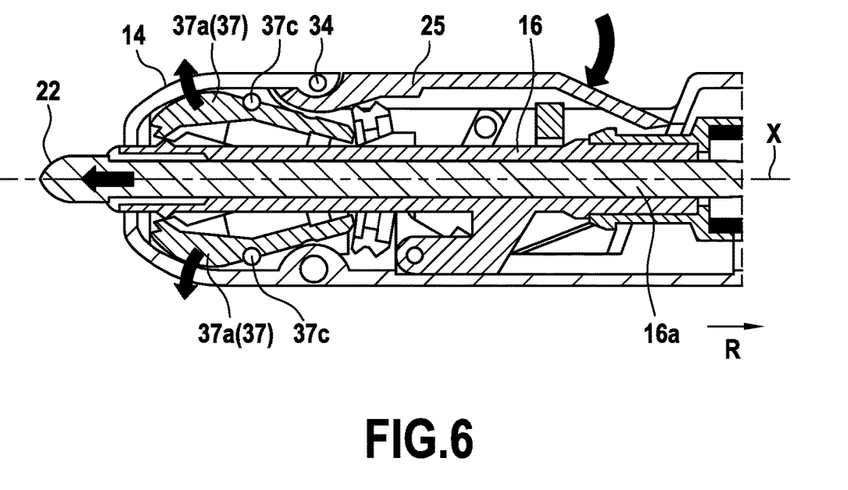
FIG. 6 shows a close-up view of the area VI of FIG. 5.
Figure 7:
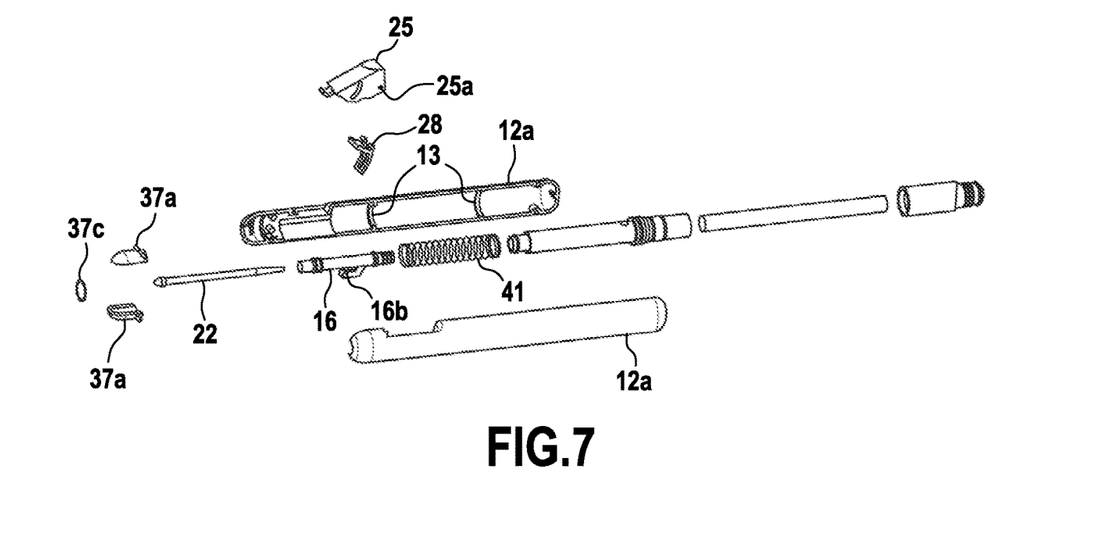
FIG. 7 shows an exploded view of the first exemplary embodiment of the writing instrument.

FIGS. 4, 5 and 6 show that when the sealing member 37 is in the open position, the sealing member 37 is positioned away from axis X, opening the writing passage 14a and exposing the writing tip 22.

The sealing member 37 may comprise two sealing parts 37a. The two sealing parts 37a may pivot around respective transverse axes, between the closed position and the open position, for example along a respective pin axis (not shown). For the sake of facilitated understanding, the plane of the half-section views of FIGS. 2, 3, 5 and 6 is perpendicular to the pivot direction of the sealing parts 37a; such that rotations are within the plane of the figures (see local movements associated with movement of the black arrows of FIG. 6).

The two sealing parts 37a may be arranged such that one sealing part 37a is symmetrical to the other sealing part 37a by 180° rotation along the axis X. In complement or as an example, the two sealing parts 37a are symmetrical along a virtual plane. In the embodiment, the virtual plane may be the plane comprising the axis X and extending in the pivot direction of the sealing parts 37a, i.e. the direction perpendicular to the plane of the figures. The symmetry or symmetries of the two sealing parts 37a may be observed only in the closed position or in the open position. The symmetry or symmetries of the two sealing parts 37a may be observed in the closed position, in the open position and in any intermediate position.

In case of more than two sealing parts 37a, the sealing parts 37a may be arranged symmetrically along the axis X by multiple-fold rotational symmetry.

The sealing member 37 may include a seal, such as a rubber seal, positioned on an inner surface of the sealing member 37 and that is configured to, when the sealing member 37 is in the closed position, interact with the cartridge 16 so as to make the interface between the sealing member 37 and the cartridge 16 substantially air tight.

As the cartridge 16 moves through the writing passage 14a toward the first extended forward position, the cartridge 16 actuates the sealing member 37 from the closed position to the open position. In the example shown, the cartridge 16 comes into contact against the sealing member 37 and pushes the sealing member 37 from the closed position to the open position. In particular, the cartridge 16 pushes open the sealing parts 37a. When the cartridge 16 is in the second retracted rearward position, the cartridge 16 does not form an obstacle to the movement of the sealing member 37, and in particular allows the sealing member to move from the open position to the closed position.

In the example shown, the sealing parts 37a extend along the axis X. The sealing parts 37a may extend further rearward than the writing tip 22, when in the closed position. In particular, the sealing parts 37a may extend so as to be in contact with the cartridge 16 by surrounding the front end of the cartridge 16 when in the closed position. The sealing parts 37a may sealingly cooperate with the cartridge 16 when in the closed position. Therefore, when the sealing member 37 is in the closed position, the sealing parts 37a and the cartridge 16 may define a sealing chamber 37b therein. The sealing chamber 37b may be hermetically sealed, such that the writing tip 22 at the end of the cartridge 16 may be protected by being provided in the sealing chamber 37b.

A biasing member may be provided for urging the sealing member 37 from the open position to the closed position. In particular, the biasing member may be provided for urging the sealing parts 37a from the open position to the closed position.

The biasing member may include a resilient member 37c. The resilient member 37c may be a toric elastic member. The resilient member 37c may for example be arranged against an outer surface of the sealing parts 37a, such that contraction of the resilient member 37c leads to urging the sealing parts 37a into the closing position.

A groove may be formed in the outer surface of the sealing parts 37a so as to receive the resilient member 37c.

The button 25 is configured to pivot about a pivot point, such as pin axis 34, that is perpendicular to the axis X of the barrel 12. The pin axis 34 may be located on or near an external surface of the barrel 12, and the pin axis 34 may be formed of a portion of the barrel 12.

When the button 25 is in the resting position (FIGS. 1, 2 and 3), such that a user has not actuated the button 25, the sealing member 37 is in the closed position closing the writing passage 14a. Thus, actuation of the button 25 (FIGS. 4, 5 and 6), such as by a user, provides for: 1) the writing tip 22 being pushed laterally (e.g., axially, along axis X) through the writing passage 14a such that the writing tip 22 is now in position for marking and 2) the sealing member 37 being pushed into the open position such that the writing passage 14a is no longer closed and the writing tip 22 is exposed. Likewise, when the button 25 is released, the writing tip 22 may be withdrawn back into the barrel 12 of the writing instrument 10, and the sealing member may move into the closed position, thus returning the writing instrument 10 to the state of FIGS. 1, 2 and 3.

The sealing system 20 may further comprise a biasing member 41, e.g. a spring, that is longitudinally disposed in the writing instrument 10 and has two opposite ends along its longitudinal dimension: one end may rest against at least one fixed stop that is arranged on an inner surface of the barrel 12, e.g. under the form of a peripheral inner ridge, and the opposite end of biasing member 41 may be ostensibly connected to the button 25, either directly or through an intermediary component. In the illustrations, the biasing member 41 is connected to the cartridge 16, and it is to be understood that the biasing member 41 may be connected operationally to the button 25 through linkages or components within the sealing system 20. Thus the biasing member 41 is positioned between a fixed part of the barrel 12 and a component of the button 25, or component otherwise interlinked with the button such as the cartridge 16, so as to exert permanent opposite (antagonistic) pressure against the actuation of the button 25. This ultimately pushes in a rearward direction the cartridge 16, and therefore pushes the sealing system 20 toward the second retracted position.

Because the button 25 is exerting a torque force on the linkage 28 during actuation, the linkage 28 becomes increasingly parallel to the axis X (that is, the linkage 28 forms an angle with the axis X which increasingly decreases to approach zero), and thus to the biasing member 41. As the linkage 28 becomes increasingly parallel to the axis X, less torque force is required to counteract the biasing member 41. Therefore, the linkage 28 is configured to better resist the biasing member 41 the more parallel the linkage is to axis X. the more parallel the linkage 28 becomes, e.g. during the process of actuating the button 25, the less force is needed to keep the button 25 pressed to counteract the force of the biasing member 41.

When the user ceases to actuate the button 25, the sealing system 20 is automatically released without any further specific action from the user and can slide rearwardly inside the barrel 12 under the action of biasing member 41, which is no longer compensated for by the actuation of the button 25, to occupy the second retracted position. Therefore the mere release of the button 25 as described above makes it possible to automatically close the sealing system 20 and cause the latter to move to a second retracted rearward position wherein the writing tip 22 is retracted inside the barrel 12 and the sealing member 37 is closed over the writing tip 22.

The barrel 12 may be formed of two parts. For example, the barrel 12 may be formed of two halves 12a assembled along a plane of assembly. The plane of assembly may be the plane in which the linkage 28 moves. In other words, the plane may be the plane in which the cartridge 16 and the button 25 move.

A second embodiment of the writing instrument will be described below with reference to FIGS. 9 to 16. FIGS. 9 to 16 are views of the second embodiment of the writing instrument which respectively correspond, with respect to the type of views and the position of the writing instrument, to FIGS. 1 to 8 of the first embodiment.

Unless stated otherwise, features of the second embodiment are the features of the first embodiment discussed above. For the sake of simplicity, these features are not repeated, and the same reference signs are used for the same parts, incremented by 100.

The button 125 may be configured to translate perpendicularly to the axis X of the barrel 112. Upon actuation, the button 125 may be moved closer to the axis X of the barrel 112. When the button 125 is not actuated, the button 125 may be moved away from the axis X due to the biasing member 141, as described above.

The sealing parts 137a may be configured to translate perpendicularly to the axis X of the barrel 112. The writing tip 122 may thus push open the sealing member 137 by pushing apart the sealing parts 137a.

Figure 16:
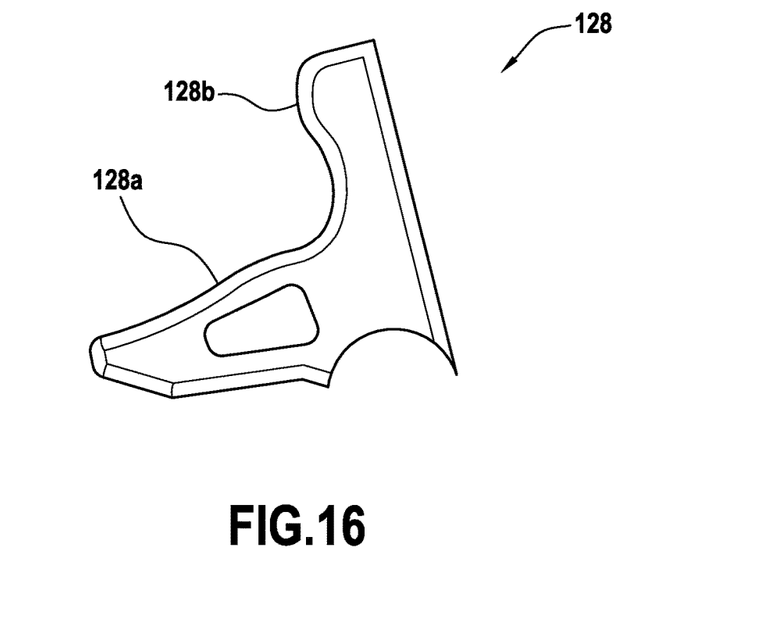
FIG. 16 shows a schematic side view of a linkage according to the second exemplary embodiment of the writing instrument.
Figure 17:
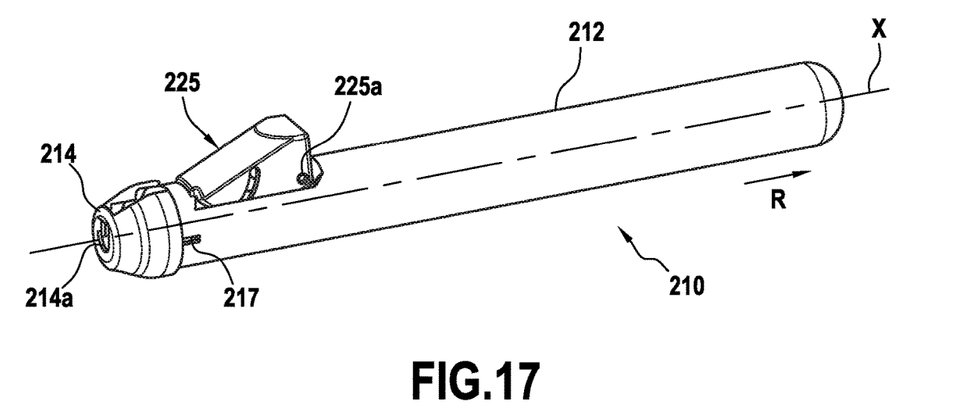
FIG. 17 shows a perspective view of a third exemplary embodiment of a writing instrument of the present disclosure in a retracted state.
Figure 18:
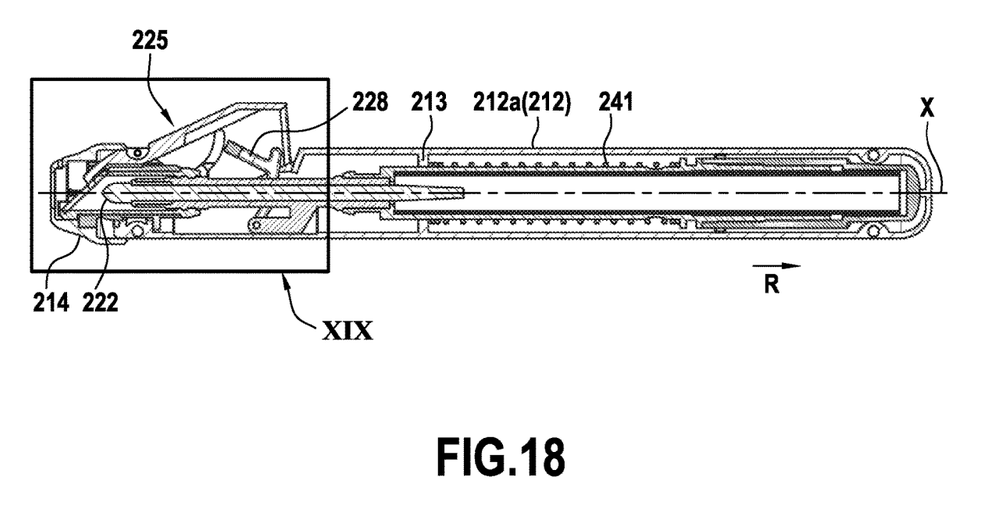
FIG. 18 shows a half-section view of the third exemplary embodiment of a writing instrument of the present disclosure in the retracted state.
Figure 19:
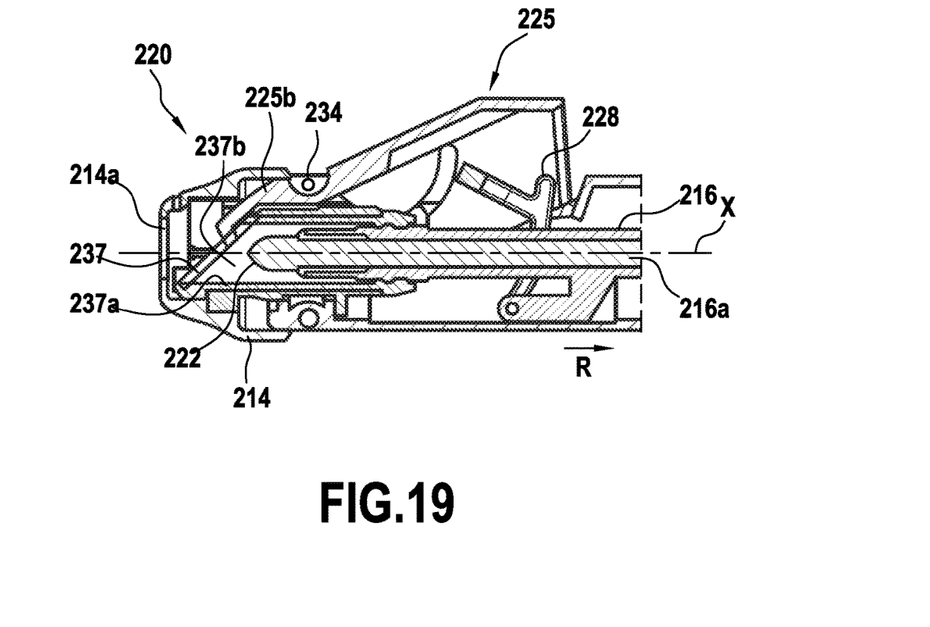
FIG. 19 shows a close-up view of the area XIX of FIG. 18.

A schematic side view of the linkage 128 is shown on FIG. 16.

The linkage 128 may have a first side surface 128a configured to come in contact with a corresponding surface 125a of the button 125. As the button 125 is actuated, pressure is applied from the button 125 to the linkage 128 via their respective surface 125a and first side surface 128a.

The linkage 128 may be configured to rotate with respect to the barrel 112. For example, the linkage 128 may be configured to pivot around a pin axis 112c of the barrel 112.

The linkage 128 may have a second side surface 128b configured to come in contact with a corresponding surface 116b of the cartridge 116. As the button 125 is actuated, the linkage 128 is rotated around the pin axis of the barrel 12, such that the second side surface 128b pushes the surface 116b of the cartridge 116 frontward.

Actuation of the button 125 may thus push the cartridge 116 to move into the first extended forward position.

In the first exemplary embodiment, the linkage 16 is defined as comprising one pivot with the button 25 and one pivot with the cartridge 16. In the second exemplary embodiment, the linkage 116 is defined as being having a first side surface 128a configured to come in contact with a corresponding surface 125a of the button 125 and a second side surface 128b configured to come in contact with a corresponding surface 116b of the cartridge 116.

A third embodiment of the writing instrument will be described below with reference to FIGS. 17 to 22. FIGS. 17 to 22 are views of the third embodiment of the writing instrument which respectively correspond, with respect to the type of views and the position of the writing instrument, to FIGS. 1 to 6 of the first embodiment.

Unless stated otherwise, features of the third embodiment are the features of the first embodiment discussed above. For the sake of simplicity, these features are not repeated, and the same reference signs are used for the same parts, incremented by 200.

Figure 20:
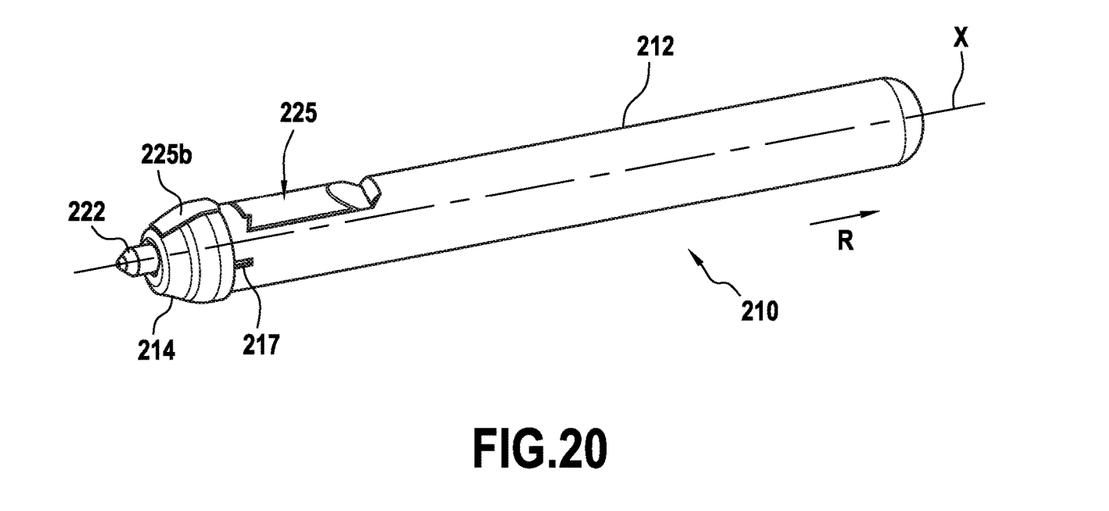
FIG. 20 shows a perspective view of the third exemplary embodiment of a writing instrument of the present disclosure in a writing state.
Figure 21:
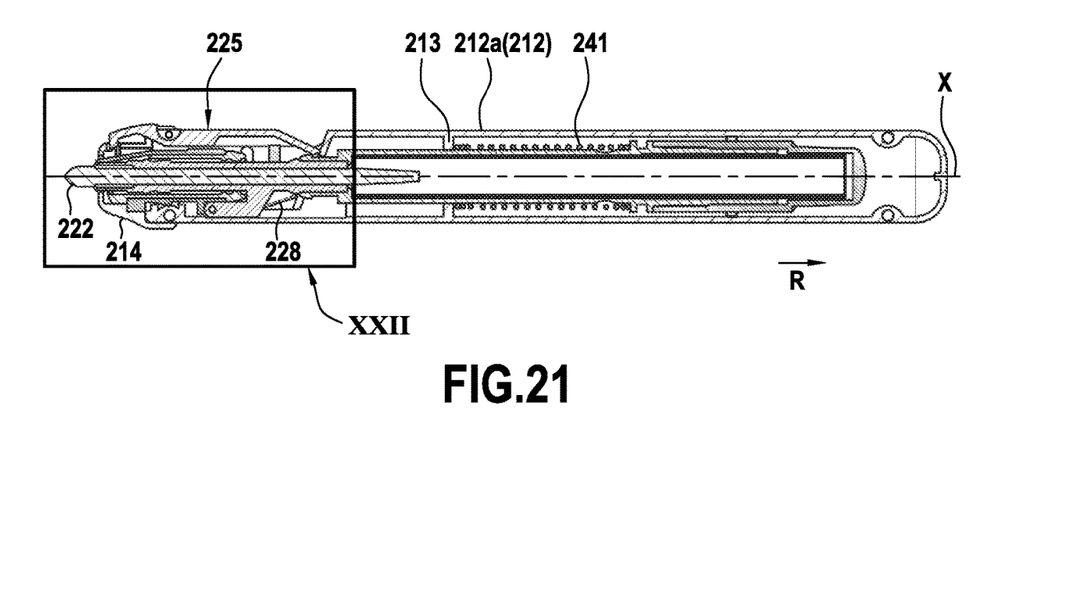
FIG. 21 shows a half-section view of the third exemplary embodiment of a writing instrument of the present disclosure in the writing state.
Figure 22:
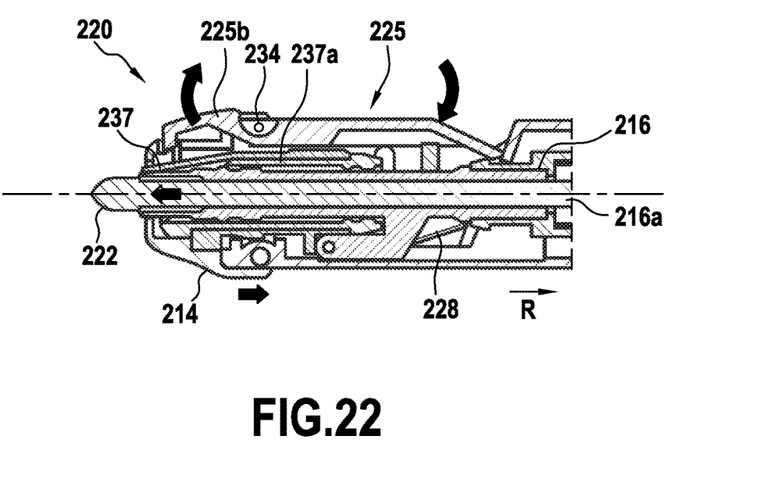
FIG. 22 shows a close-up view of the area XXII of FIG. 21.

The writing instrument 210 may comprise at a first forward end of the barrel 212 a cap 214 having a writing passage 214a formed therein. The cap 214 is mounted at the forward end of the writing instrument 210 such that the cap surrounds the forward end, with the writing passage 214a of the cap facing the writing tip 222, so as to allow the writing tip 222 to extend through the writing passage 214a when the cartridge 216 is in the first extended forward position detailed below with respect to FIGS. 20, 21, 22. The cap 214 may be detachably attached to the barrel 212, such that the tip component 214 may be removed, for example, to replace internal components of the writing instrument 210. The cap 214 may be slidably attached to the barrel 212, for example along grooves 217 extending rearward from the tip of the barrel 212. The writing instrument 210 may also include a cartridge 216. The sealing system 220 may include a sealing member 237 that is configured to, when in a closed position (such as in FIGS. 17, 18 and 19), substantially close the writing passage 214a so as to enclose the writing tip 222 within the barrel 212 of the writing instrument 210, and when in an open position (such as in FIGS. 20, 21 and 22), allow passage of the writing tip 222 through the writing passage 214a outside of the barrel 212 of the writing instrument 210. The sealing member 237 may be located at or near the forward end of the barrel 212. In an aspect, the sealing member 237 may include a seal, such as a rubber seal, positioned on an inner surface of the sealing member 237 and that is configured to, when the sealing member 237 is in the closed position, interact with the barrel 212 so as to make the interface between the sealing member 237 and the cap 214 substantially air tight. FIGS. 20, 21 and 22 show that when the sealing member 237 is in the open position, the sealing member 237 is positioned away from axis X, opening the writing passage 214a and exposing the writing tip 222.

As the cartridge 216 moves through the writing passage 214a toward the first extended forward position, the cartridge 216 actuates the sealing member 237 from the closed position to the open position. In the example shown, the cartridge 216 comes into contact against the sealing member 237 and pushes the sealing member 237 from the closed position to the open position. When the cartridge 216 is in the second retracted rearward position, the cartridge 216 does not form an obstacle to the movement of the sealing member 237, and in particular allows the sealing member to move from the open position to the closed position.

In the example shown, the sealing member 237 comprises an axial wall 237a. The axial wall 237a may extend axially. The axial wall 237a may sealingly cooperate with the cartridge 216. The forward end of the sealing member 237 may sealingly cooperate with the axial wall 237a when in the closed position. The forward end of the sealing member 237 and the axial wall 237a may be of unibody construction (integrally formed). When the sealing member is in the closed position, the forward end of the sealing member 237, the axial wall 237a and the cartridge 216 may define a sealing chamber 237b therein. The sealing chamber 237b may be hermetically sealed, such that the writing tip 222 at the end of the cartridge 216 may be protected by being provided in the sealing chamber 237b.

When the button 225 is actuated, the forward end 225b of the button 225 is moved radially outward (see arrow in FIG. 22), e.g. away from the sealing member 237, thereby allowing the sealing member 237 to move to the open position. When the state of the button 225 changes from being actuated to not being actuated, the forward end 225b of the button 225 pushes the sealing member 237 into the closed position.

The end of the sealing member 237 is able to pivot between the closed position and the open position. The pivot axis of the forward end of the sealing member 237 is substantially parallel to the pivot axis 234. Thus, the sealing member 237 is controlled by the button such that the sealing member 237 is configured to move into an open position when the button 225 is actuated and to move into a closed position when the button 225 is not actuated, wherein when the sealing member 237 is in the closed position, the sealing member 237 substantially closes the writing passage 214a.

The cap 214 may be actuated rearward when the button 225 is actuated, and forward when the button 225 is not actuated. For example the cap 214 may be moved along the grooves 217. In other words, the cap 214 may be actuated so as to slide in an opposite manner with respect to sliding of the cartridge 216. The cap 214 may thus move rearward when the writing tip 222 moves toward the first extended forward position, so as to not form an obstacle to using the writing tip 222 on a writing surface, and move forward when the writing tip 222 moves toward the second rearward position, so as to protect the writing tip 222 and more generally the sliding and rotating pieces in the forward end of the writing instrument 210.

Actuation of the cap 214 may for example be achieved through a sliding or a rotating cam (not shown), the cam being actuated directly or through an intermediary component by the button 225 or by the cartridge 216.

Naturally, any combination between the linkages 16, 116, 216 of the first exemplary embodiment, the second exemplary embodiment and the third exemplary embodiment may be considered, for instance a linkage having zero, one or two pivots of the first embodiment and correspondingly two, one or no side surface of the second embodiment.

Although the embodiments of the present disclosure have been disclosed for illustrative purposes, those skilled in the art will appreciate that various modifications and alterations are possible, without departing from the present disclosure. It is also to be understood that such modifications and alterations are incorporated in the scope of the present disclosure and the accompanying claims.

The invention claimed is:

1. A writing instrument comprising:
a barrel having a longitudinal axis;
a cartridge;
a writing tip provided at one end of the cartridge;
a self-retracting and sealing system configured to slide the cartridge axially inside the barrel between a first extended forward position wherein the writing tip extends outside the barrel and a second retracted rearward position wherein the writing tip is retracted inside the barrel from the first extended forward position along an axial rearward direction, the self-retracting and sealing system comprising:
a button configured to, when actuated, move the cartridge into the first extended forward position, and when not actuated, move the cartridge into the second retracted rearward position; and
a sealing member configured to be actuated between a closed position where the sealing member closes a writing passage of the writing instrument and an open position where the writing passage is not closed by the sealing member; and
a cap configured to be actuated so as to slide in an opposite manner with respect to the sliding of the cartridge along the longitudinal axis,
wherein the cartridge is configured to actuate the sealing member from the closed position to the open position when the cartridge is moved from the second retracted rearward position to the first extended forward position and to allow the sealing member to move from the open position to the closed position when the cartridge is in the second retracted rearward position.

2. The writing instrument according to claim 1, wherein the sealing member comprises two moveable sealing parts configured to move between the closed position and the open position of the sealing member.

3. The writing instrument according to claim 2, wherein the two moveable sealing parts sealingly cooperate with each other when the sealing member is in the closed position.

4. The writing instrument according to claim 2, wherein the two moveable sealing parts are configured to be brought together in the closed position of the sealing member and to move apart from each other in the open position.

5. The writing instrument according to claim 4, wherein, in the open position, the two moveable sealing parts define between them the writing passage.

6. The writing instrument according to claim 2, comprising a first biasing member for urging the sealing member from the open position to the closed position.

7. The writing instrument according to claim 6, wherein the self-retracting and sealing system further comprises a second biasing member configured to urge the self-retracting and sealing system toward the second retracted rearward position, wherein the second biasing member is a spring.

8. The writing instrument according to claim 6, wherein the first biasing member comprises a resilient member attached to the two moveable sealing parts so as to permanently urge the two moveable sealing parts to be brought together.

9. The writing instrument according to claim 8, wherein the resilient member is arranged against an outer surface of each of the two moveable sealing parts, such that contraction of the resilient member leads to urging the two moveable sealing parts into the closed position.

10. The writing instrument according to claim 9, wherein a groove is formed in the outer surface of the two moveable sealing parts to receive the resilient member.

11. The writing instrument according to claim 1, wherein the button is configured to actuate the sealing member from the open position to the closed position by pushing against an outer surface of the sealing member.

12. The writing instrument according to claim 1, wherein the cartridge is configured to push against an inner surface of the sealing member to actuate the sealing member from the closed position to the open position.

13. The writing instrument according to claim 1, wherein the self-retracting and sealing system further comprises a linkage that connects the button and the cartridge, the linkage being configured to convert an actuation of the button into a linear motion of the cartridge along the longitudinal axis.

14. The writing instrument according to claim 13, wherein the linkage comprises a first end and a second end, the first end connected to the button in a rotating manner and the second end connected to the cartridge in a rotating manner, wherein when the button is actuated, the first end of the linkage is pushed closer to the longitudinal axis and the second end of the linkage is moved frontward thereby bringing the cartridge towards the first extended forward position.

15. The writing instrument according to claim 1, wherein the sealing member is configured to interact with the cartridge when the sealing member is in the closed position so as to form a sealing chamber therein, the writing tip being inside the sealing chamber when the cartridge is in the second retracted rearward position.

16. The writing instrument according to claim 15, wherein the sealing member further comprises an axial wall attached on the cartridge and forming a wall of the sealing chamber.

17. The writing instrument according to claim 1, wherein the button is located at or near a forward end of the barrel so as to be operable by a user when the writing instrument is held in a writing position.

18. The writing instrument according to claim 1, wherein the cartridge is configured to supply a writing medium to the writing tip.

19. A writing instrument comprising:
    a barrel having a longitudinal axis;
    a cartridge;
    a writing tip provided at one end of the cartridge; and
    a self-retracting and sealing system configured to slide the cartridge axially inside the barrel between a first extended forward position wherein the writing tip extends outside the barrel and a second retracted rearward position wherein the writing tip is retracted inside the barrel from the first extended forward position along an axial rearward direction, the self-retracting and sealing system comprising:
        a button configured to, when actuated, move the cartridge into the first extended forward position, and when not actuated, move the cartridge into the second retracted rearward position; and
        a sealing member configured to be actuated between a closed position where the sealing member closes a writing passage of the writing instrument and an open position where the writing passage is not closed by the sealing member;
    wherein the cartridge is configured to actuate the sealing member from the closed position to the open position when the cartridge is moved from the second retracted rearward position to the first extended forward position and to allow the sealing member to move from the open position to the closed position when the cartridge is in the second retracted rearward position, wherein the button has a forward end configured to move radially away from the sealing member when the button is actuated, thereby allowing the sealing member to move to the open position, and wherein when a state of the button changes from being actuated to not being actuated, the forward end of the button pushes the sealing member into the closed position.

20. The writing instrument according to claim 19, wherein the button is located at or near a forward end of the barrel so as to be operable by a user when the writing instrument is held in a writing position.

* * * * *